(12) United States Patent
Robbin et al.

(10) Patent No.: US 7,560,637 B1
(45) Date of Patent: Jul. 14, 2009

(54) GRAPHICAL USER INTERFACE AND METHODS OF USE THEREOF IN A MULTIMEDIA PLAYER

(75) Inventors: Jeffrey L. Robbin, Los Altos, CA (US); Steve Jobs, Palo Alto, CA (US); Timothy Wasko, High River (CA); Greg Christie, San Jose, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 647 days.

(21) Appl. No.: 11/238,587

(22) Filed: Sep. 28, 2005

Related U.S. Application Data

(63) Continuation of application No. 10/282,861, filed on Oct. 28, 2002, now Pat. No. 7,166,791.

(60) Provisional application No. 60/399,806, filed on Jul. 30, 2002.

(51) Int. Cl.
*G01H 1/00* (2006.01)
*G10H 1/18* (2006.01)

(52) U.S. Cl. .................. 84/615; 84/477 R; 84/619; 84/653; 84/657

(58) Field of Classification Search .................. None
See application file for complete search history.

(56) References Cited

U.S. PATENT DOCUMENTS

| | | | |
|---|---|---|---|
| 5,559,945 A | 9/1996 | Beaudet et al. |
| 5,583,993 A | 12/1996 | Foster et al. |
| 5,616,876 A | 4/1997 | Cluts |
| 5,640,566 A | 6/1997 | Victor et al. |
| 5,666,530 A | 9/1997 | Clark et al. |
| 5,710,922 A | 1/1998 | Alley et al. |
| 5,721,949 A | 2/1998 | Smith et al. |
| 5,727,202 A | 3/1998 | Kucala |
| 5,739,451 A | 4/1998 | Winksy et al. |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,918,213 A | 6/1999 | Bernard et al. |

(Continued)

FOREIGN PATENT DOCUMENTS

EP 0 917 077 5/1999

(Continued)

OTHER PUBLICATIONS

Etchison, "Accelerated Discrete Adjustment of the Parameters of a Process", IBM Technical Disclosure Bulletin, vol. 15, No. 5, Oct. 1, 1972, 2 pgs.

(Continued)

*Primary Examiner*—Marlon T Fletcher

(57) ABSTRACT

In a portable multimedia device, a method, apparatus, and system for providing user supplied configuration data are described. In one embodiment, a hierarchically ordered graphical user interface is provided. A first order, or home, interface provides a highest order of user selectable items each of which, when selected, results in an automatic transition to a lower order user interface associated with the selected item. In one of the described embodiments, the lower order interface includes other user selectable items associated with the previously selected item from the higher order user interface.

22 Claims, 9 Drawing Sheets

U.S. PATENT DOCUMENTS

| | | | |
|---|---|---|---|
| 5,918,303 A * | 6/1999 | Yamaura et al. | 84/609 |
| 5,923,757 A | 7/1999 | Hocker et al. | |
| 5,925,843 A | 7/1999 | Miller et al. | |
| 5,963,916 A | 10/1999 | Kaplan | |
| 5,969,283 A | 10/1999 | Looney et al. | |
| 6,000,000 A | 12/1999 | Hawkins et al. | |
| 6,006,274 A | 12/1999 | Hawkins et al. | |
| 6,038,199 A | 3/2000 | Pawlowski et al. | |
| 6,041,023 A | 3/2000 | Lakhansingh | |
| 6,061,306 A | 5/2000 | Buchheim | |
| 6,125,369 A | 9/2000 | Wu et al. | |
| 6,172,948 B1 | 1/2001 | Keller et al. | |
| 6,208,044 B1 | 3/2001 | Viswanadham et al. | |
| 6,216,131 B1 | 4/2001 | Liu et al. | |
| 6,243,328 B1 | 6/2001 | Fenner et al. | |
| 6,243,725 B1 | 6/2001 | Hempleman et al. | |
| 6,247,135 B1 | 6/2001 | Feague | |
| 6,248,946 B1 * | 6/2001 | Dwek | 84/609 |
| 6,272,545 B1 | 8/2001 | Flanagin et al. | |
| 6,283,764 B2 | 9/2001 | Kajiyama et al. | |
| 6,295,541 B1 | 9/2001 | Bodnar et al. | |
| 6,332,175 B1 | 12/2001 | Birrell et al. | |
| 6,338,044 B1 | 1/2002 | Cook et al. | |
| 6,341,316 B1 | 1/2002 | Kloba et al. | |
| 6,356,971 B1 | 3/2002 | Katz et al. | |
| 6,380,947 B1 | 4/2002 | Stead | |
| 6,389,467 B1 | 5/2002 | Eyal | |
| 6,453,281 B1 | 9/2002 | Walters et al. | |
| 6,490,432 B1 | 12/2002 | Wegener et al. | |
| 6,493,758 B1 | 12/2002 | McLain | |
| 6,523,124 B1 | 2/2003 | Lunsford et al. | |
| 6,529,804 B1 | 3/2003 | Draggon et al. | |
| 6,563,769 B1 | 5/2003 | Van Der Meulen | |
| 6,587,403 B1 | 7/2003 | Keller et al. | |
| 6,587,404 B1 | 7/2003 | Keller et al. | |
| 6,621,768 B1 | 9/2003 | Keller et al. | |
| 6,636,873 B1 | 10/2003 | Carini et al. | |
| 6,664,981 B2 | 12/2003 | Ashe et al. | |
| 6,665,803 B2 | 12/2003 | Lunsford et al. | |
| 6,718,348 B1 | 4/2004 | Novak et al. | |
| 6,721,489 B1 | 4/2004 | Benyamin et al. | |
| 6,731,312 B2 | 5/2004 | Robbin | |
| 6,760,721 B1 | 7/2004 | Chasen et al. | |
| 6,763,345 B1 | 7/2004 | Hempleman et al. | |
| 6,779,019 B1 | 8/2004 | Mousseau et al. | |
| 6,785,542 B1 | 8/2004 | Blight et al. | |
| 6,794,566 B2 | 9/2004 | Pachet | |
| 6,801,964 B1 | 10/2004 | Mahdavi | |
| 6,874,037 B1 | 3/2005 | Abram et al. | |
| 6,928,433 B2 | 8/2005 | Goodman et al. | |
| 6,956,562 B1 | 10/2005 | O'Hara et al. | |
| 6,978,127 B1 | 12/2005 | Bulthuis et al. | |
| 6,987,221 B2 | 1/2006 | Platt | |
| 7,010,758 B2 | 3/2006 | Bate | |
| 7,022,905 B1 * | 4/2006 | Hinman et al. | 84/609 |
| 7,069,058 B2 | 6/2006 | Kawashima | |
| 7,075,000 B2 * | 7/2006 | Gang et al. | 84/600 |
| 7,111,009 B1 | 9/2006 | Gupta | |
| 7,136,934 B2 | 11/2006 | Carter et al. | |
| 7,295,983 B2 * | 11/2007 | Fujiwara et al. | 704/270 |
| 2001/0004310 A1 | 6/2001 | Kono | |
| 2001/0011308 A1 | 8/2001 | Clark et al. | |
| 2001/0018858 A1 * | 9/2001 | Dwek | 84/609 |
| 2001/0021053 A1 | 9/2001 | Colbourne et al. | |
| 2001/0041021 A1 | 11/2001 | Boyle et al. | |
| 2001/0044835 A1 | 11/2001 | Schober et al. | |
| 2001/0048642 A1 | 12/2001 | Berhan | |
| 2001/0052123 A1 | 12/2001 | Kawai | |
| 2002/0002413 A1 | 1/2002 | Tokue | |
| 2002/0013784 A1 | 1/2002 | Swanson | |
| 2002/0046315 A1 | 4/2002 | Miller et al. | |
| 2002/0055934 A1 | 5/2002 | Lipscomb et al. | |
| 2002/0113824 A1 | 8/2002 | Myers | |
| 2002/0116082 A1 | 8/2002 | Gudorf | |
| 2002/0133515 A1 | 9/2002 | Kagle et al. | |
| 2002/0138606 A1 | 9/2002 | Robison | |
| 2002/0161865 A1 | 10/2002 | Nguyen | |
| 2002/0174269 A1 | 11/2002 | Spurgat et al. | |
| 2002/0194309 A1 | 12/2002 | Carter et al. | |
| 2003/0013493 A1 | 1/2003 | Irimajiri et al. | |
| 2003/0030733 A1 | 2/2003 | Seaman et al. | |
| 2003/0037254 A1 | 2/2003 | Fischer et al. | |
| 2003/0046434 A1 | 3/2003 | Flanagin et al. | |
| 2003/0050058 A1 | 3/2003 | Walsh et al. | |
| 2003/0074457 A1 | 4/2003 | Kluth | |
| 2003/0076301 A1 | 4/2003 | Tsuk | |
| 2003/0079038 A1 | 4/2003 | Robbin et al. | |
| 2003/0112279 A1 | 6/2003 | Irimajiri | |
| 2003/0167318 A1 | 9/2003 | Robbin et al. | |
| 2003/0182315 A1 | 9/2003 | Plastina et al. | |
| 2003/0191756 A1 | 10/2003 | Oh | |
| 2003/0210821 A1 | 11/2003 | Yogeshwar et al. | |
| 2003/0221541 A1 * | 12/2003 | Platt | 84/609 |
| 2004/0001395 A1 | 1/2004 | Keller et al. | |
| 2004/0001396 A1 | 1/2004 | Keller et al. | |
| 2004/0017997 A1 | 1/2004 | Cowgill | |
| 2004/0027930 A1 | 2/2004 | Kudo | |
| 2004/0055446 A1 | 3/2004 | Robbin et al. | |
| 2004/0076086 A1 | 4/2004 | Keller et al. | |
| 2004/0078416 A1 | 4/2004 | Kawasaki et al. | |
| 2004/0139180 A1 | 7/2004 | White et al. | |
| 2004/0139844 A1 * | 7/2004 | Tsuboi | 84/600 |
| 2004/0225762 A1 | 11/2004 | Poo | |
| 2005/0080915 A1 | 4/2005 | Shoemarker | |
| 2005/0262528 A1 | 11/2005 | Herley et al. | |
| 2006/0027080 A1 | 2/2006 | Schultz | |
| 2006/0100978 A1 | 5/2006 | Heller et al. | |
| 2006/0168340 A1 | 7/2006 | Heller et al. | |
| 2006/0168351 A1 | 7/2006 | Ng | |
| 2007/0038941 A1 | 2/2007 | Wysocki et al. | |
| 2007/0074118 A1 | 3/2007 | Robbin et al. | |
| 2007/0084333 A1 | 4/2007 | Robbin et al. | |
| 2007/0124680 A1 | 5/2007 | Robbin et al. | |
| 2008/0086494 A1 | 4/2008 | Heller et al. | |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 8/2000 |
| JP | 2001-93226 | 4/2001 |
| JP | 2001-117800 | 4/2001 |
| WO | WO 95/16950 | 6/1995 |
| WO | WO 01/33569 | 5/2001 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 03/036541 | 5/2003 |
| WO | 2004/004338 | 1/2004 |
| WO | WO 2004-004338 | 1/2004 |
| WO | WO 2004/084413 | 9/2004 |

OTHER PUBLICATIONS

U.S. Appl. No. 11/757,214, entitled "Intelligent synchronization of media player with host computer", filed Jun. 1, 2007.

U.S. Appl. No. 11/757,204, entitled "Intelligent synchronization of media player with host computer", filed Jun. 1, 2007.

U.S. Appl. No. 11/830,645, entitled "Multiple media type synchronization between host computer and media device", filed Jul. 30, 2007.

U.S. Appl. No. 11/679,082, entitled "Data Synchronization with Host Device in Accordance with Synchronization Preferences", filed Feb. 26, 2007.
U.S. Appl. No. 11/679,114, entitled "Data Backup for Mobile Device", filed Feb. 26, 2007.
U.S. Appl. No. 10/936,233, entitled "Method and system for dynamically populating groups in a developer environment", filed Sep. 7, 2004.
U.S. Appl. No. 11/679,091, entitled "Background Data Transmission between Media Device and Host Device", filed Feb. 26, 2007.
U.S. Appl. No. 11/767,443, entitled "Widget Synchronization in Accordance with Synchronization Preferences", filed Jun. 22, 2007.
Replay Gain, "Replay Gain—A proposed Standard," Oct. 7, 2001, available from http://replaygain.hydrogenaudio.org/index.html and http://replaygain.hydrogenaudio.org/outline.html.
Glenn Fleishman, "Handheld iPod joins MP3 band a bit late, but is standout player," Nov. 6, 2001, http://seattletimes.nwsource.com/html/businesstechnology/134361811_ptmacc040.html.
"Hewlett Packard Jornada 525 Color Pocket PC," downloaded Jan. 25, 2002, http://www.pc4d.com/electronics/products/56/jornada_color_pocket_pc.shtml.
iTunes, Digital Music for your Mac, Apple Computer, Inc., downloaded Oct. 22, 2001, http://www.apple.com/itunes/.
"Rio Portable Music Player," Web Review, downloaded Jan. 25, 2002, http://www.webreviews.com/9901/rio.html.
Andy Lindauer, "What's in your Pocket?," Edgereview, downloaded Jan. 25, 2002, http://www.edgereview.com/print.cfm?Type=aag&ID=286.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
Vetro et al., "Media Conversions to Support Mobile Users," IEEE Canadian Conference on Electrical and Computer Engineering, Piscataway, NJ, May 13, 2001, pp. 607-612.
Zheng et al., "MobiGATE: a mobile gateway proxy for the active deployment of transport entities," Proceedings of the 2004 International Conference on Parallel Processing, Piscataway, NJ, Aug. 15, 2004.
Compaq Computer Corp., copyright 1991, Personal Jukebox User Manual, pp. 1-29.
RealJukebox Plus Manual, Real Networks, Inc., copyright 1999, pp. 1-83, RealJukebox, Real Networks, Inc., webpages downloaded Oct. 27, 2005 http://www.real.com/Jukebox/release_notes.html#.
TuneBase 100 User Guide, A CD Library Management System, Escient, Inc. copyright 1999.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Bridgman, "Windows XP Expert Zone Community Columist", Using Windows Mobil-based Portable Media Centers and Windows Media Player 10, Aug. 25, 2004, 1-11.
De Herrera, Chris, "Microsoft ActiveSync 3.1," Version 1.02, Oct. 13, 2000.
IEEE 1394—Wikipedia, 1995, http://www.wikipedia.org/wiki/Firewire.
Miniman, "Applian Software's Replay Radio and Player v1.02," Product review, pocketnow.com, http://www.pocketnow.com/reviews/replay/replay.htm, Jul. 31, 2001.

Personal Jukebox (PJB), "Systems Research Center and PAAD," Compaq Computer Corp., Oct. 13, 2000, http://research.compaq.com/SRC/pjb/.
Compaq, "Personal Jukebox," Jan. 24, 2001, http://research.compaq.com/SRC/pjb/.
Steinberg, "Sonicblue Rio Car,"Product Review, Dec. 12, 2000, http://electronics.cnet.com/electronics/0-6342420-1304-4098389.html.
Andrew Birrell, "Personal Jukebox (PJB)," Oct. 13, 2000, http://birrell.org/andrew/talks/pjb-overview.ppt.
Travis Butler, "Portable MP3: The Nomad Jukebox," Jan. 8, 2001, http://db.tidbits.com/getbits.acgi?tbart=06261.
Travis Butler, "Archos Jukebox 6000 Challenges Nomad Jukebox," Aug. 13, 2001, http://db.tidbits.com/getbits.acgi?tbart=06521.
Adam C. Engst, "SoundJam Keeps on Jammin'," Jun. 19, 2000, http://db.tidbits.com/getbits.acgi?tbart=05988.
Musicmatch, "Musicmatch and Xing Technology Introduce Musicmatch Jukebox," May 18, 1998, http://www.musicmatch.com/info/company/press/releases/?year=1998&release=2.
"Nomad Jukebox," User Guide, Creative Technology Ltd., Version 1, Aug. 2000.
"Apple's iPod Available in Stores Tomorrow," Press Release, Apple Computer, Inc. Nov. 9, 2001.
"Apple Introduces iTunes—World's Best and Easiest To Use Jukebox Software," Macworld Expo, San Francisco, Jan. 9, 2001.
iTunes, Playlist Related Help Screens, iTunes v1.0, Apple Computer, Inc., Jan. 2001.
"Apple Announces iTunes 2," Press Release, Apple Computer, Inc., Oct. 23, 2001.
Specification Sheet, iTunes 2, Apple Computer, Inc., Oct. 31, 2001.
iTunes 2, Playlist Related Help Screens, iTunes v2.0, Apple Computer, Inc., Oct. 23, 2001.
SoundJam MP Plus, Representative Screens, published by Casady & Greene, Inc., Salinas, CA, 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
MG-25, Portable MPEG4 Player (MG-25), Jul. 29, 2004, 1-3 pgs.
Iriver, "PMP140/120", Sep. 13, 2004, 1-2 pgs.
Nutzel et al., "Sharing Systems for Future HiFi Systems", Proceedings of the Fourth International Conference on Web Delivering of Music, Sep. 13, 2008, 8 pgs.
Wikipedia: "iTunes", www.wikipedia.com, May 9, 2005, 6 pages.
"Diamond Multimedia Announces Rio PMP300 Portable MP3 Music Player", Press Release, http://news.harmony-central.com/Newp/1998/Rio-PMP300.html, Sep. 14, 1998, 4 pgs.
"Digital Still Cameras - Downloading Images to a Computer," Mimi Chakarova et al., Multi-Media Reporting and Convergence, Jan. 18, 2006, 2 pgs.
Handbook for Palm™ m500 Series Handhelds, User Manual, copyright 1998-2001.
RCA Lyra User's Guide, RD2201/2202/2204, www.lyrazone.com, pp. 1-37, (1999).
Lyra, Personal Digital Player, RCA, Product Box. (2003).
"About MusicMatch Jukebox," MusicMatch Jukebox v4 Help, pp. 1-4, (1999).
TuneBase Pro Mk-II User's Guide, Escient, Inc., (1999).
Office Action in U.S. Appl. No. 11/608,211, dated Apr. 9, 2009.
Office Action in U.S. Appl. No. 11/608,211, dated Nov. 12, 2008.

* cited by examiner

US 7,560,637 B1

GRAPHICAL USER INTERFACE AND METHODS OF USE THEREOF IN A MULTIMEDIA PLAYER

CROSS REFERENCE TO RELATED APPLICATIONS

This application is a continuation of U.S. patent application Ser. No. 10/282,861, entitled "GRAPHICAL USER INTERFACE AND METHODS OF USE THEREOF IN A MULTIMEDIA PLAYER", filed Oct. 28, 2002, now U.S. Pat. No. 7,166,791 which is incorporated herein by reference, and which, in turn, claims the benefit of priority under 35 U.S.C. § 119(e) to U.S. Provisional Patent Application No. 60/399,806, entitled "GRAPHICAL USER INTERFACE AND METHODS OF USE THEREOF IN A MULTIMEDIA PLAYER", filed on Jul. 30, 2002, which is incorporated herein by reference.

BACKGROUND OF THE INVENTION

1. Field of Invention

This invention relates generally to multimedia devices. More specifically, the invention describes a graphical user interface for use in a multimedia asset player suitable for providing any number and kind of user supplied inputs.

2. Description of Related Art

Recent developments in consumer electronics have included the introduction of portable multimedia asset player devices such as MP3 players, minidisk players, and the like. For example, in the case of an MP3 player, a number of digitized audio files in the form of MP3 files are stored in a storage medium included in or coupled to the player in a fashion deemed most suitable to that user. In the case of MP3 files, for example, a user of the MP3 player must be able to peruse and select a particular file, or files, based upon such characteristics as music genre, author, album, or whatever grouping of MP3 files is present in the MP3 player.

What is required is a user interface that provides for a user friendly and efficient retrieval of stored multimedia asset files in a portable multimedia asset player.

SUMMARY OF THE INVENTION

The invention described herein pertains to a user interface that provides for a user friendly and efficient retrieval of stored multimedia asset files. The invention can be implemented in numerous ways. Several embodiments of the invention are discussed below.

As a method of assisting user interaction with a multimedia asset player by way of a pathwise bi-directional user interface, one embodiment of the invention includes at least the acts of: displaying a first order user interface having a first list of user selectable items each of which points to at least one second list of user selectable items; receiving a user selection of one of the user selectable items from the first list; and automatically transitioning to and displaying a second order user interface based upon the selected one of the user selectable items from the first list, the second order user interface having the second list of user selectable items pointed to by the selected one of the user selectable items from the first list. Each of the user selectable items in the second list points back to the corresponding one of the user selectable items in the first list and points forward to at least one user selectable item in a third list of user selectable items displayed by a corresponding third order user interface.

As a pathwise bi-directional method of selecting a desired multimedia asset from a number of multimedia assets stored in a multimedia asset player, one embodiment of the invention includes at least the acts of: displaying a first order user interface having a first set of user selectable items each of which points to a second set of other user selectable items displayed on a second order user interface; receiving a user navigation input with respect to the first set of user selectable items to identify one of the user selectable items of the first set, the user navigation input being associated with a rotational user action with respect to a user input device of the multimedia asset player; accepting the identified one of the user selectable items of the first set; automatically transitioning to and displaying the second set of user selectable items each of which points back to the identified one of the user selectable items of the first set and points forward to a third order user interface; and receiving and acting upon at least one additional user input until a desired multimedia asset is selected.

As a portable media player, one embodiment of the invention includes at least the acts of: a storage device that stores media content for each of a plurality of media items; a display screen that displays one of a plurality of hierarchically ordered sets of user selectable items; a user input device that enables a user to interact with the one of more of the hierarchically ordered sets of user selectable items being displayed on the display screen; and a processor operatively connected to the storage device and the user input device. The processor controls the portable media player to facilitate user navigation through the one of more of the hierarchically ordered sets of user selectable items to select a particular media item to be played, and then to play the media content of the particular media item that was selected. In facilitating user navigation through the one of more of the hierarchically ordered sets of user selectable items, the processor operates to (i) display, on the display screen, a first order user interface having a first list of user selectable items each of which points to at least one second list of user selectable items; (ii) receive, via the user input device, a user selection of one of the user selectable items from the first list; and (iii) automatically transitioning to and displaying, on the display screen, a second order user interface based upon the selected one of the user selectable items from the first list, the second order user interface having the second list of user selectable items pointed to by the selected one of the user selectable items from the first list.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Figure 1:
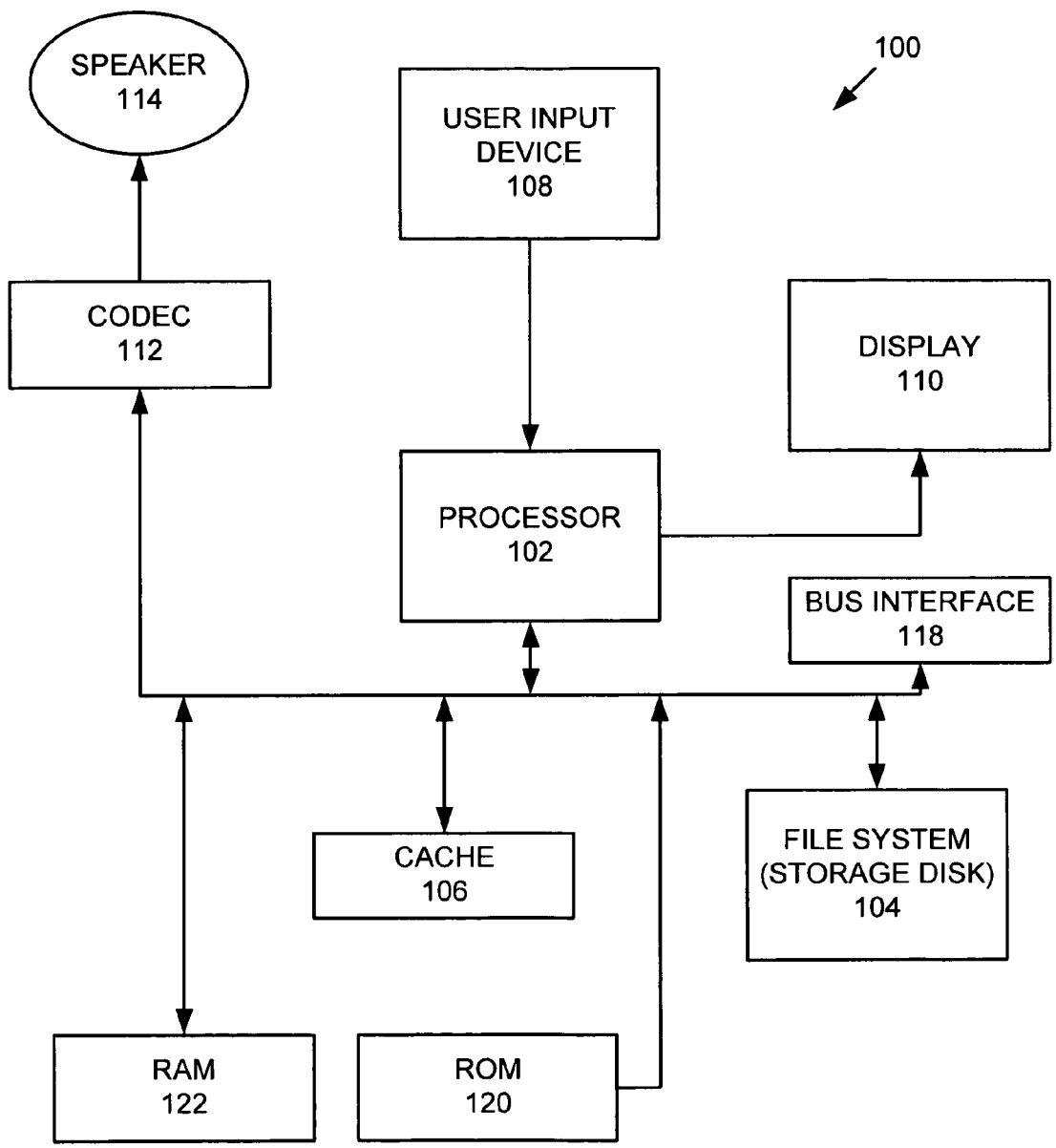
FIG. 1 shows an exemplary portable multimedia device 100 in accordance with an embodiment of the invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

With the rapid advancement in the ability to store data, multimedia asset players, such as MP3 players, can accommodate hundreds or even thousands of such assets, such as MP3 files, making the task of selecting, grouping, or retrieving a particular file, or files, a daunting task indeed. Therefore the invention described herein is well suited for providing a user friendly and efficient user interface for retrieving media assets for use in a portable multimedia asset player. In the described embodiment, the multimedia asset player takes the form of a pocket sized, portable MP3 player. Accordingly, a method and apparatus for providing user supplied inputs to the MP3 player are described. Such user supplied inputs can include user supplied commands directed at retrieving specific files, such as digitized audio files in the form of, for example, MP3 files.

In one embodiment, a hierarchically ordered graphical user interface are provided that facilitates a user file selection procedure. In this particular embodiment, a first order (sometimes referred to as a home interface) provides a highest order of user selectable items each of which, when selected, results in an automatic transition to a lower order user interface associated with the selected item. In one of the described embodiments, the lower order interface includes other user selectable items associated with the previously selected item from the higher order user interface. In this way, a user can automatically transition from a higher order interface to a lower order interface (and vice versa) by, in some cases, a direct transition. In other cases, the user can transition from the higher order user interface to the lower order user interface (and vice versa) in a step wise fashion whereby each intervening interface is displayed having any number of user selectable input items each directly associated with the previously selected input item.

In a particular embodiment, the portable multimedia device is a pocket sized, multimedia device (personal digital assistants, personal MP3 player/recorders, and the like) having a display screen arranged to display the various user interfaces and a corresponding user input device. The user input device is typically a manually operated switch, button, wheels, or other such contrivances. Accordingly, the invention will now be described in terms a portable multimedia asset player capable of storing a number of multimedia assets. For example, in the case of the multimedia asset player being an MP3 player (such as the iPod® player manufactured by the Apple Computer Inc. of Cupertino, Calif.), the multimedia assets can include MP3 files as well as any other appropriately formatted data files.

Accordingly, FIG. 1 shows an exemplary portable multimedia device, or media player, 100 in accordance with an embodiment of the invention. The media player 100 includes a processor 102 that pertains to a microprocessor or controller for controlling the overall operation of the media player 100. The media player 100 stores media data pertaining to media assets in a file system 104 and a cache 106. The file system 104 is, typically, a storage disk or a plurality of disks. The file system 104 typically provides high capacity storage capability for the media player 100. However, since the access time to the file system 104 is relatively slow, the media player 100 can also include a cache 106. The cache 106 is, for example, Random-Access Memory (RAM) provided by semiconductor memory. The relative access time to the cache 106 is substantially shorter than for the file system 104. However, the cache 106 does not have the large storage capacity of the file system 104. Further, the file system 104, when active, consumes more power than does the cache 106. The power consumption is particularly important when the media player 100 is a portable media player that is powered by a battery (not shown). The media player 100 also includes a RAM 120 and a Read-Only Memory (ROM) 122. The ROM 122 can store programs, utilities or processes to be executed in a non-volatile manner. The RAM 120 provides volatile data storage, such as for the cache 106.

The media player 100 also includes a user input device 108 that allows a user of the media player 100 to interact with the media player 100. For example, the user input device 108 can take a variety of forms, such as a button, keypad, dial, etc. Still further, the media player 100 includes a display 110 (screen display) that can be controlled by the processor 102 to display information to the user. A data bus 311 can facilitate data transfer between at least the file system 104, the cache 106, the processor 102, and the CODEC 110. The media player 100 also includes a bus interface 116 that couples to a data link 118. The data link 118 allows the media player 100 to couple to a host computer.

In one embodiment, the media player 100 serves to store a plurality of media assets (e.g., songs) in the file system 104. When a user desires to have the media player play a particular media item, a list of available media assets is displayed on the display 110. Then, using the user input device 108, a user can select one of the available media assets. The processor 102, upon receiving a selection of a particular media item, supplies the media data (e.g., audio file) for the particular media item to a coder/decoder (CODEC) 110. The CODEC 110 then produces analog output signals for a speaker 114. The speaker 114 can be a speaker internal to the media player 100 or external to the media player 100. For example, headphones or earphones that connect to the media player 100 would be considered an external speaker.

For example, in a particular embodiment, the available media assets are arranged in a hierarchical manner based upon a selected number and type of groupings appropriate to the available media assets. For example, in the case where the media player 100 is an MP3 type media player, the available media assets take the form of MP3 files (each of which corresponds to a digitally encoded song or other audio rendition) stored at least in part in the file system 104. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

Figure 2:
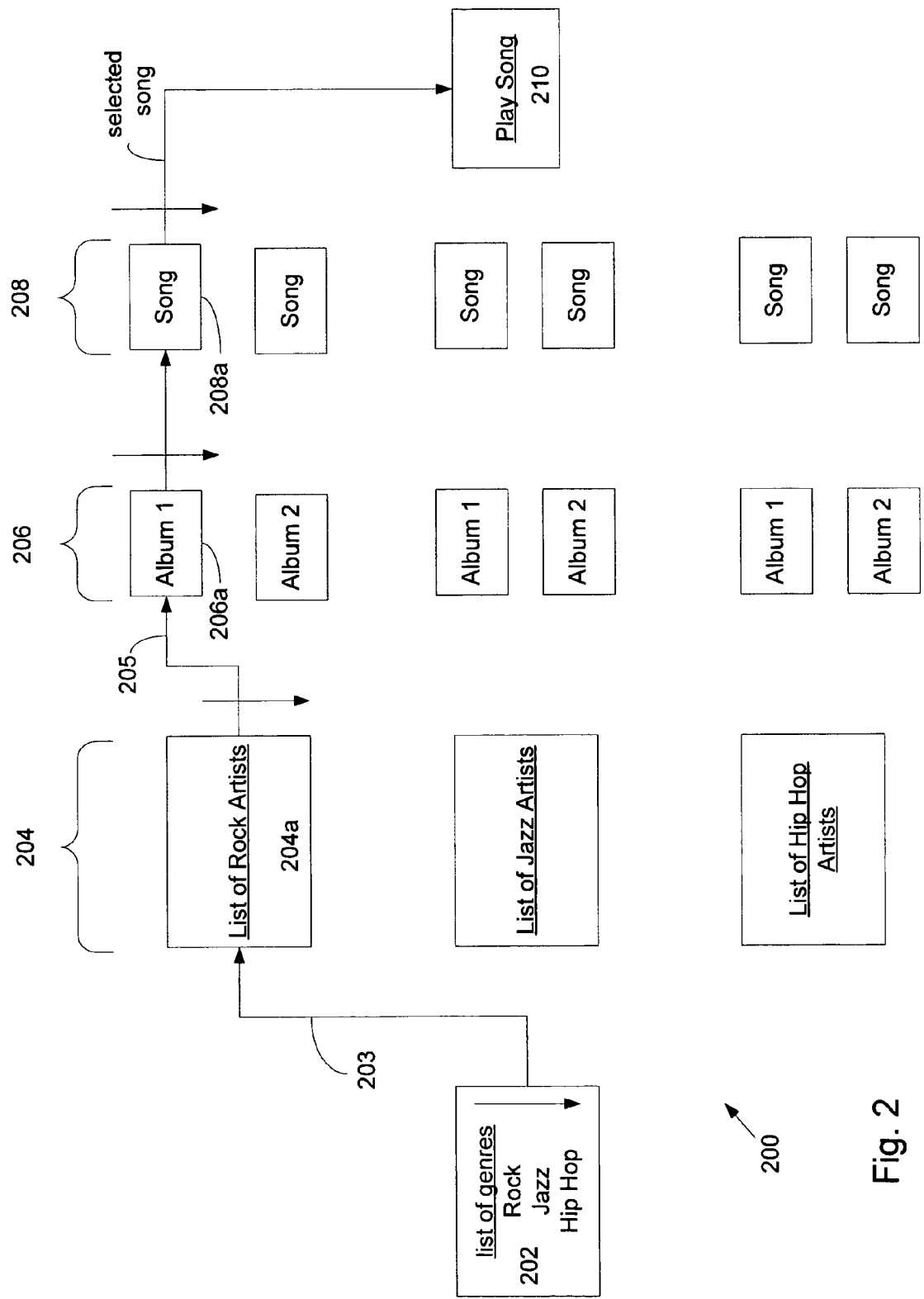
FIG. 2 illustrates a hierarchically ordered menu corresponding to stored media assets in accordance with an embodiment of the invention.

Accordingly, FIG. 2 illustrates an hierarchically ordered menu 200 used to navigate through those stored media assets of interest to a user in accordance with an embodiment of the invention. It should be noted that in the described embodiment, the menu 200 is navigated by the user scrolling vertically within a particular level in order to peruse and eventually select a particular item located within that level. Once selected, the menu 200 is automatically transitioned in a horizontal manner to a lower order interface associated with the selected item. For example, at a first level, a list of music genres 202 (ROCK, JAZZ, HIP HOP) corresponding to the available MP3 files is displayed. In order to select a particular music genre, a user scrolls "vertically down" the list 202 (usually accompanied by a pointer such as an arrow or by highlighting the adjacent item) until a desired input item is reached. Upon selecting a particular music genre (ROCK, for example), an automatic horizontal traversal 203 to a lower order interface 204 that includes a display of a list of ROCK artists 204a corresponding to the selected ROCK genre. Again after scrolling in a vertical direction in the ROCK artists list 204a, a user selects a particular one of the listed ROCK artists included in the list 204a resulting in another automatic horizontal traversal 205 to a lower order interface 206 denoting an album 206a (from a list of albums 206, if appropriate) associated with the selected artist. This procedure is continued until a particular song 208a from a list of songs 208 (included in the selected album) is selected. Once selected, the song 208a is then ready for play as described at a play song interface 210 that can in some cases include information related to the selected song 208a.

Figure 3:
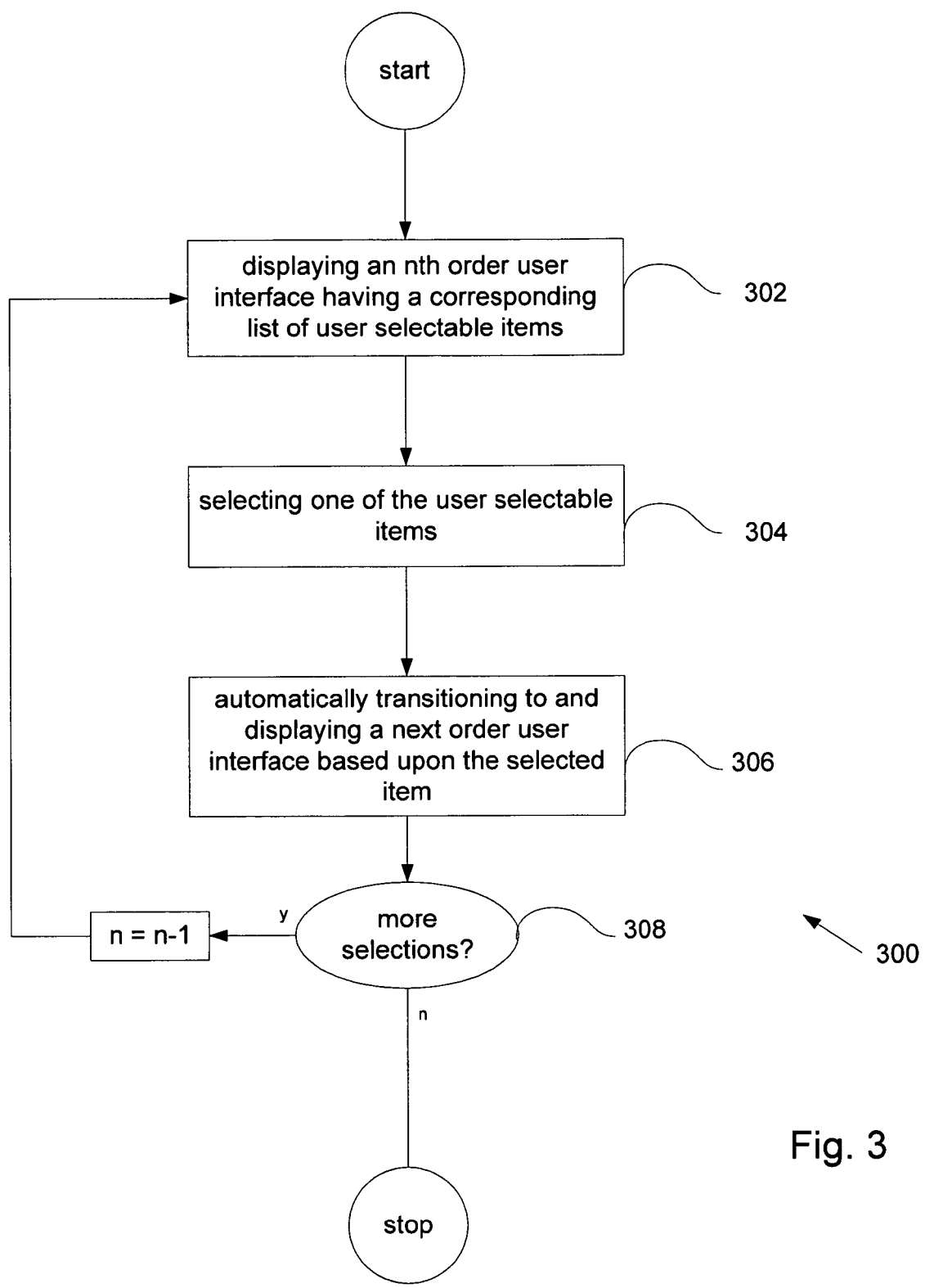
FIG. 3 shows a flowchart illustrating a particular process for selecting a particular one of a group of stored media assets in accordance with an embodiment of the invention.

FIG. 3 shows a flowchart 300 illustrating a particular process 300 for selecting a particular one of a group of stored media assets in accordance with an embodiment of the invention. Accordingly, at 302, a first order user interface is displayed having a list of first order user selectable items. In the example of FIG. 2, the first order user interface is the list of genres 202 whereas the first order user selectable items correspond to the various genres listed. Next, at 304, at least one of the user selectable items are selected and subsequently, at 306, an automatic transition to and substantially simultaneous display of a lower order user interface corresponding to the selected item. At 308, a determination is made whether or not there are additional order user interfaces based upon the latest selected item. For example, from FIG. 2 above, selection of the Rock genre from the list 202 initiates the automatic transition to the lower order user interface and substantially simultaneous display of the list of ROCK artists 204a. This process continues until a lowest order interface (i.e., the Play Song display 210) is reached at which point the selection process ends and the selected multimedia asset is played.

Figure 4:
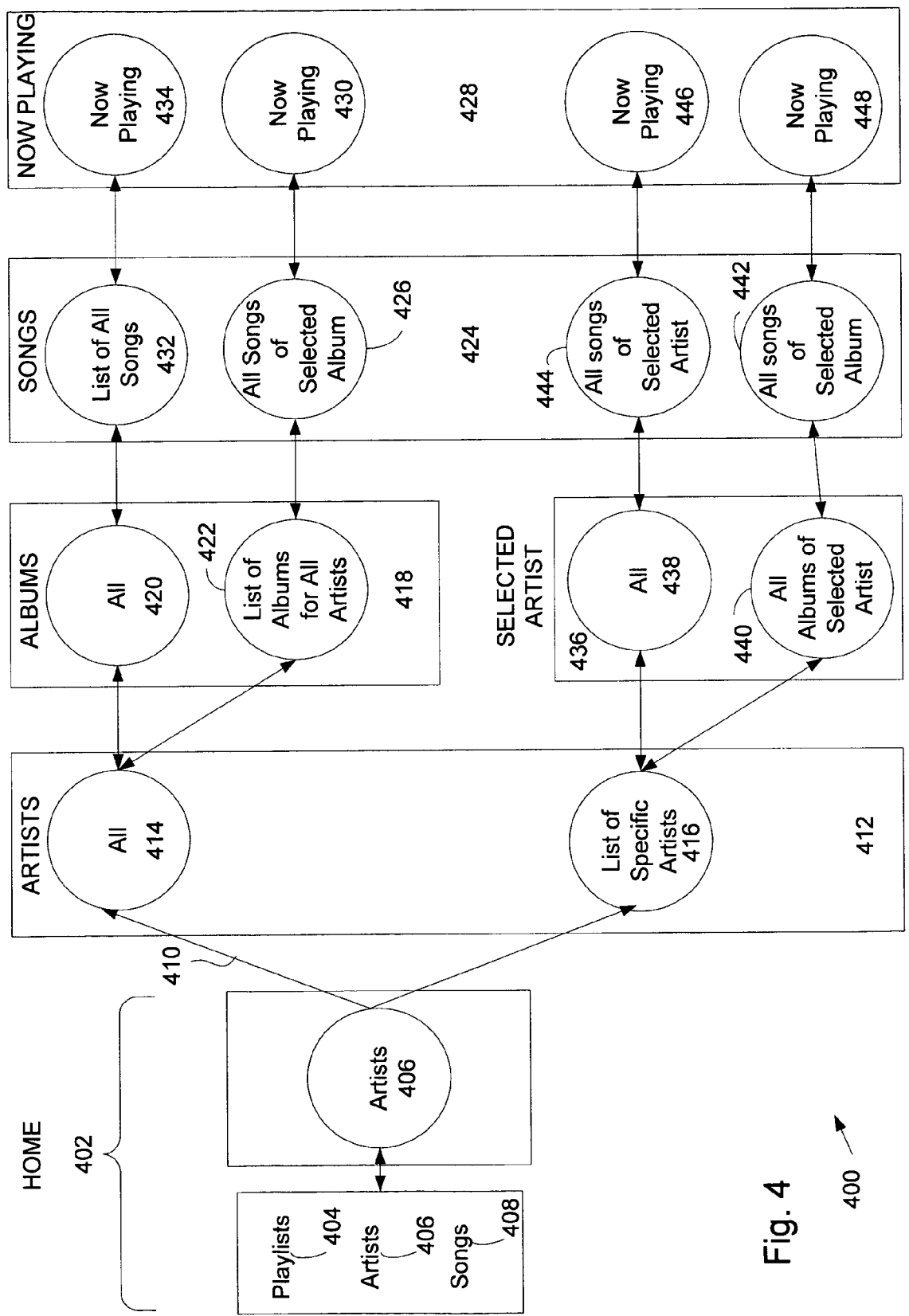
FIG. 4 shows a state diagram of a user interface suitable for providing user provided input for an exemplary MP3 player (along the lines of the player 100) in accordance with an embodiment of the invention.

FIG. 4 shows a state diagram 400 of a user interface suitable for providing user provided input for an exemplary MP3 player (along the lines of the player 100) in accordance with an embodiment of the invention. It should be noted that for sake of simplicity, only a single selection path is shown corresponding to a single selection item (i.e., Artists). Accordingly, a home interface 402 provides a list that includes a PLAYLIST item 404, an ARTISTS item 406, and a SONGS item 408 each of which is selectable by a user. It should be noted that each item is associated with a particular grouping of the multi-media assets (which in this example are MP3 files) stored at least in the file system 104. For example, the PLAYLIST item 404 is associated with a number of customizable playlists (i.e., a compendium of artists, songs, albums, etc. in any order and grouping as deemed appropriate) whereas the ARTISTS item 406 is associated with particular artists whose songs are stored in the file system 104 and so on.

Therefore, once a user selects either the PLAYLIST item 404, the ARTISTS item 406, or the SONGS item 408, an automatic transition to a lower order user interface occurs corresponding to the selected item. For example, if the user selects the ARTISTS item 406, an automatic transition 410 to the ARTISTS user interface 412 occurs that concurrently displays an ALL item 414 (associated with all artists) and a list of specific artists 416. It should be noted that, although not shown, if the user had selected a particular song from the list of songs associated with the SONGS item 408, then the display would automatically transition directly to a now playing interface (not shown) indicating that the selected song is playing (or is prepared to be played) along with any other data or information deemed appropriate.

Once in the ARTISTS user interface 412, the user has the option of selecting a particular artist by selecting a desired artist from the list of specific artists 416 or selecting all artists by invoking the ALL item 414. For example, if the user selects all artists by invoking the ALL item 414, an automatic transition to a lower order ALBUMS interface 418 occurs that concurrently displays an ALL item 420 corresponding to all songs of all artists and a list of specific albums for all artists 422. If, for example, the user selected a specific album from the list of specific albums 422, then an automatic transition to a still lower order interface ALL SONGS 424 occurs that displays a list of all songs of the selected album 426. At this point, when the user selects a particular song, an automatic transition to a now playing interface 428 occurs having a song information display 430 consistent with the selected song.

If, on the other hand, had the user had invoked the ALL item 420 in the ALBUMS interface 418, then songs interface 424 would display a list of all songs 432 of all the artists. At this point, the user could select a particular song from the list of all songs 432 resulting in an automatic transition to the now playing interface 428 having a song information display 430 consistent with the selected song.

A similar procedure can be followed in the case where instead of invoking the ALL item 414, the user had selected a particular artist from the list of artists 416. In this case, the act of selecting a particular artist initiates an automatic transition to a selected artist interface 436 that includes an ALL item 438 that points to all songs of the selected artist stored in the MP3 player and a list of all albums of the selected artist 440 that are stored in the MP3 player. Selecting one of the albums from the list of albums 440 results in an automatic transition to the songs interface 424 that includes a list of all songs associated with the selected album 442. On the other hand, invoking the ALL item 438 results in an automatic transition to the songs interface 424 having a list of all songs of the selected artist 444. Once in the songs interface 424, the user is free to select any song listed for play at the now playing interface 428. For example, selecting one of the songs listed in list of all songs of selected artist 444 or from the list of all songs of selected album 442 results in an automatic transition to the now playing interface 428 simultaneously with the display of song information displays 446 and 448, respectively.

It should be noted that the procedure described above is pathwise bi-directional in that the user can go in either direction along a selected path. It should be further noted, that in some embodiments, it is desirable to directly transition from the now playing interface 428 to the home interface 402 (and vice-versa) without displaying any of the intervening interfaces.

Figure 5A:
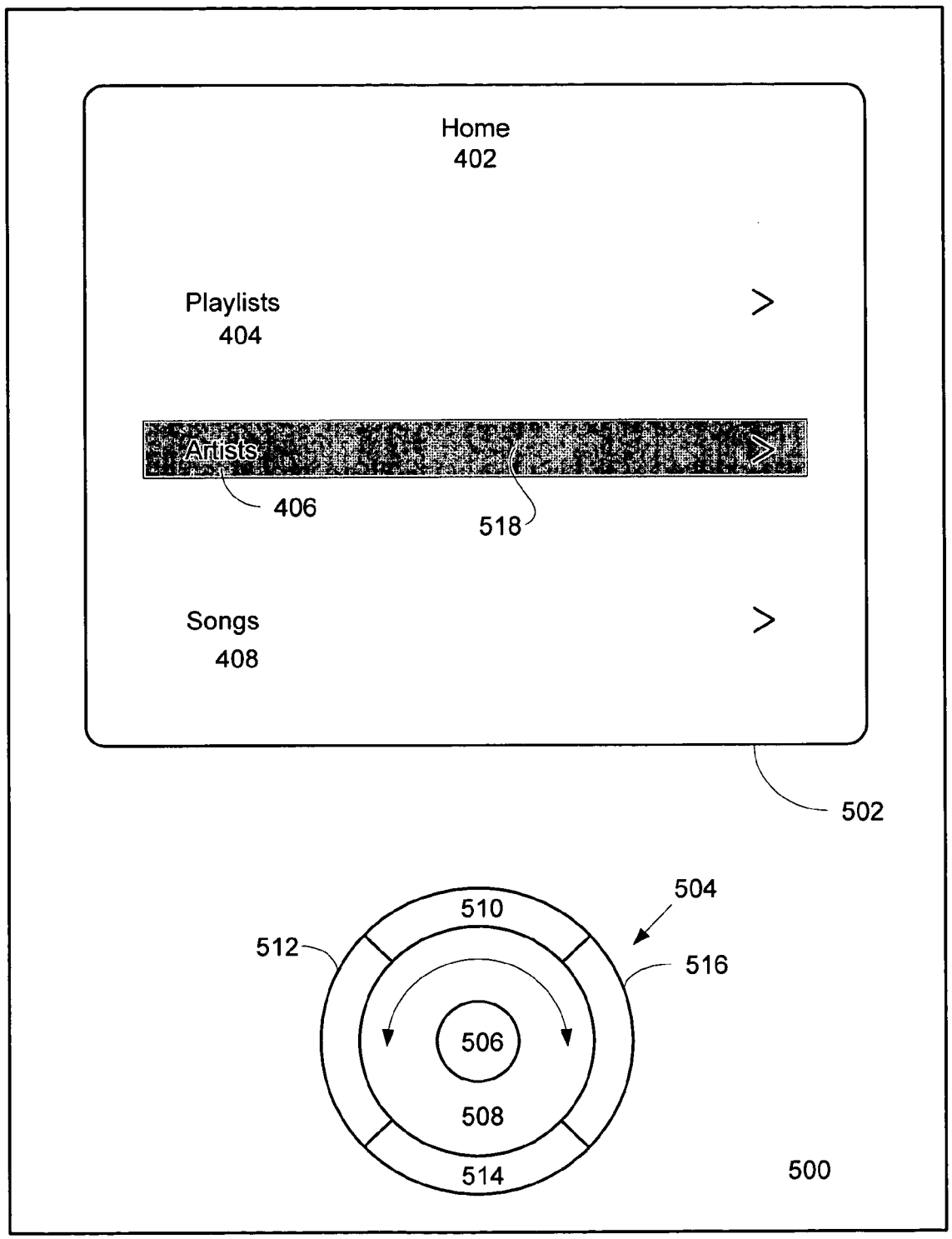
FIGS. 5A-5E illustrate various exemplary user interfaces consistent with selection and play of a media asset in accordance with an embodiment of the invention.
Figure 5B:
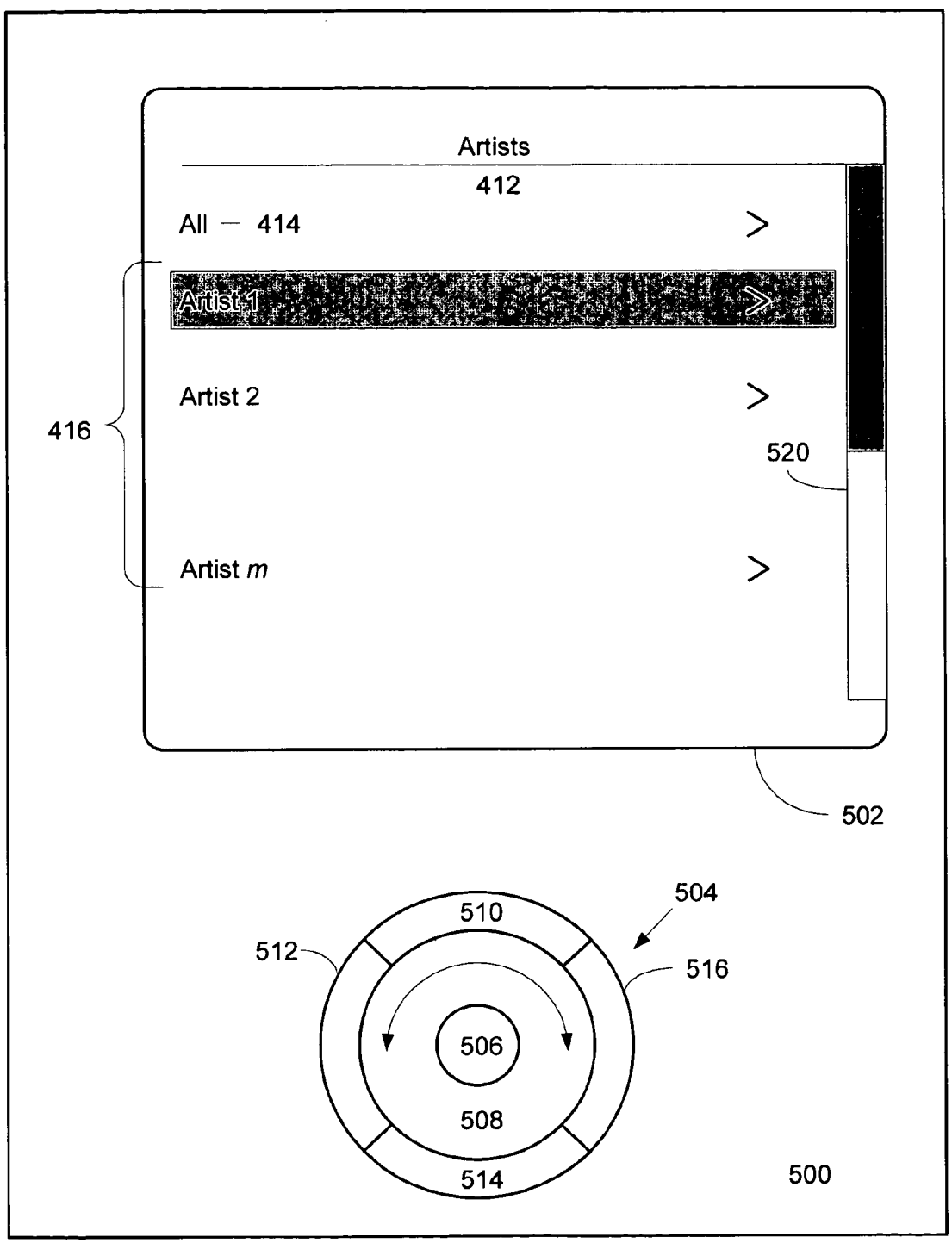
Figure 5C:
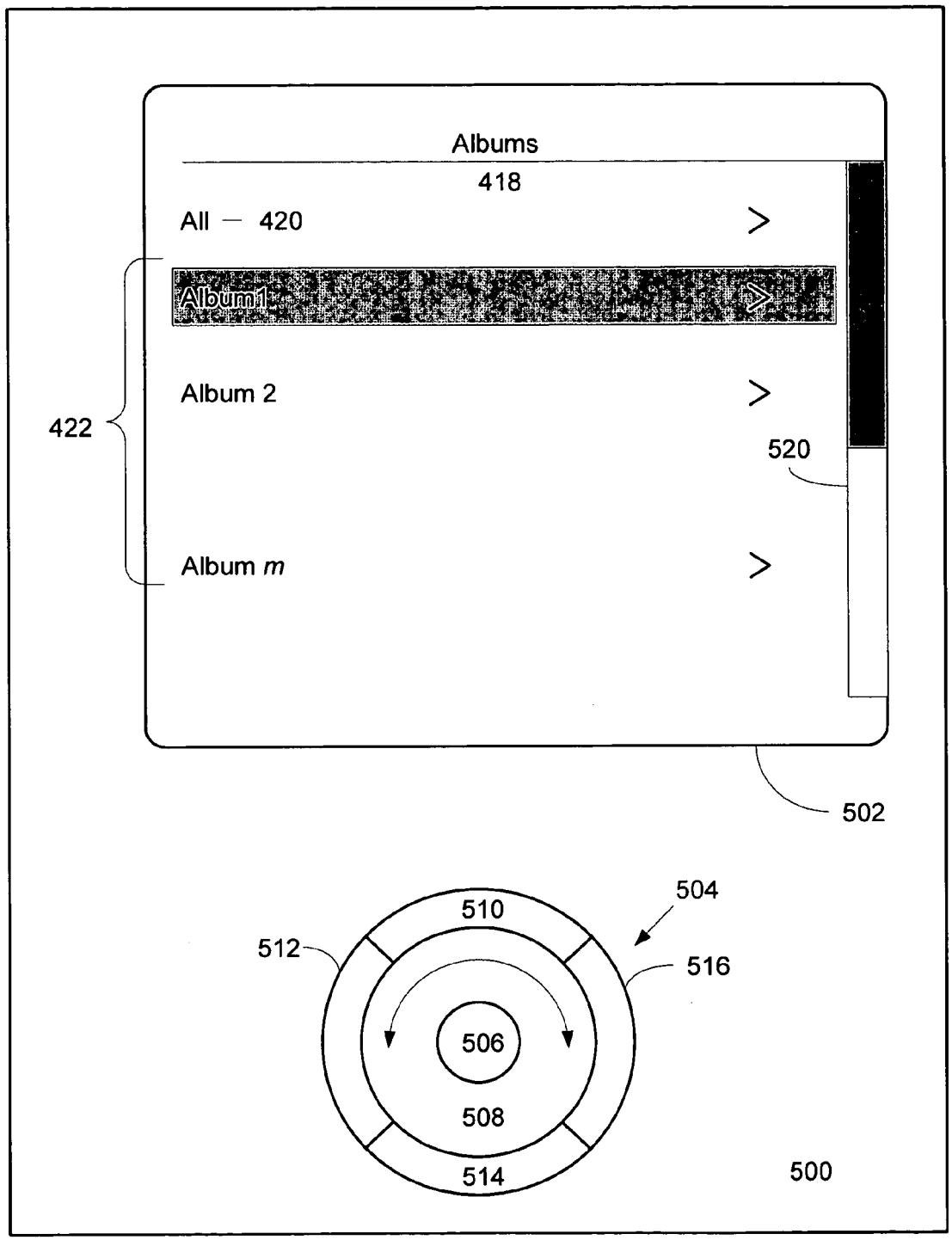
Figure 5D:
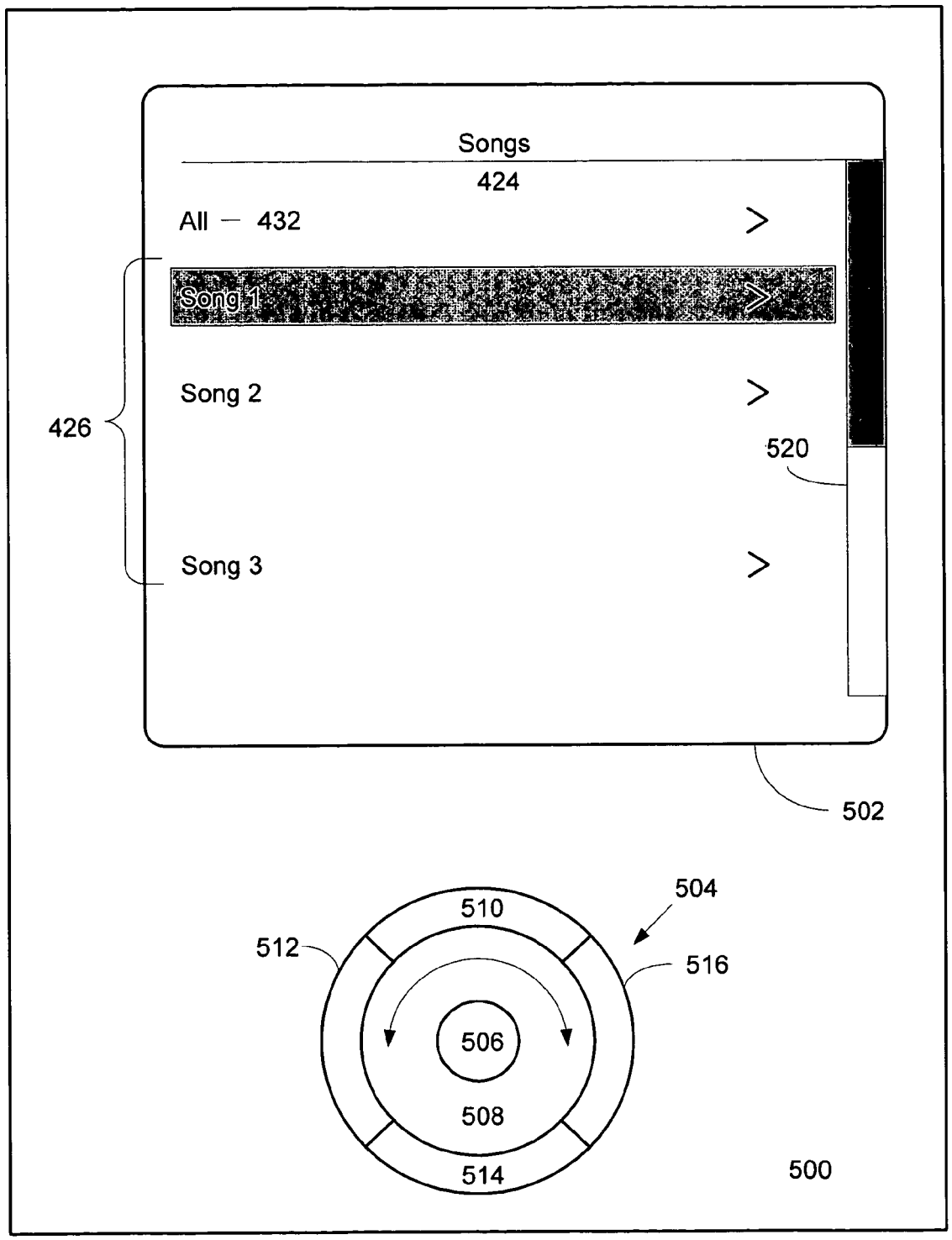
Figure 5E:
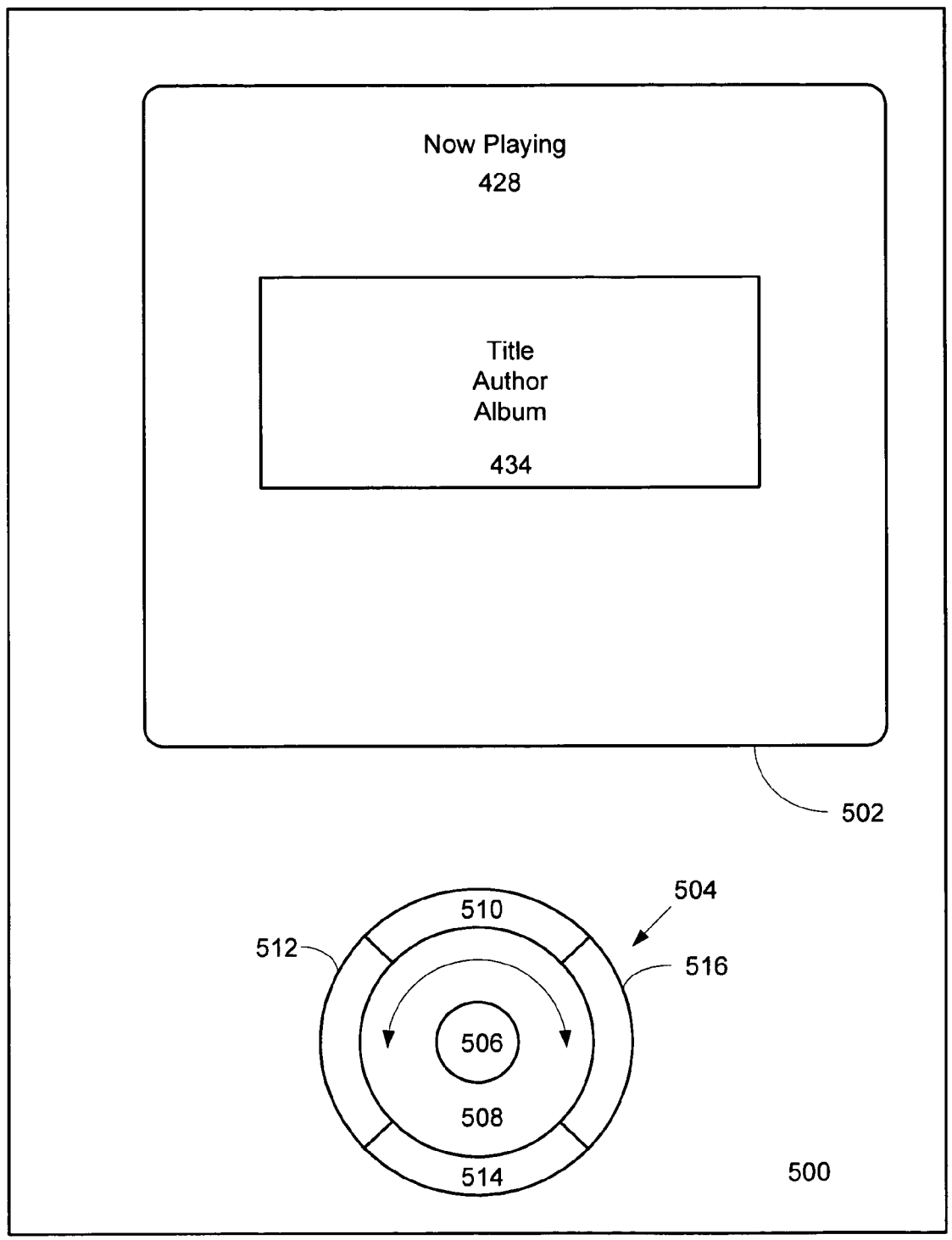

FIGS. 5A-5E illustrate various exemplary user interfaces consistent with selection and play of a media asset in accordance with an embodiment of the invention. One should note that the various user interfaces illustrated in FIGS. 5A-5E correspond to particular embodiments of the HOME interface 402, the ARTISTS interface 412, the ALBUMS interface 418, the SONGS interface 424, and the NOW PLAYING interface 428 described above. Accordingly, it should be further noted that each of the interfaces described are incorporated into a representative media player 500 having a display 502 and a user input device 504 that includes a central button 506, a selector wheel 508, and selectors 510-516. It is well to note that in this particular embodiment, the selectors 510-516 are a back up one level 510, a rewind 512, a play/pause 514, and a fast forward 516. Accordingly, FIG. 5A shows a particular implementation of the HOME interface 402 displayed on the display 502. In order to select the ARTISTS item 406, the user rotates selector wheel 508 in either a clockwise or counter-clockwise direction (or any appropriate combination thereof) until the ARTISTS item 406 is rendered selectable (as noted by a semi-transparent highlight bar 518). Once the desired item is highlighted, the user selects the highlighted item by invoking a selection protocol by, for example, pressing the central button 506. Once selected, the HOME interface 402 immediately transitions to the ARTISTS interface 412 as shown in FIG. 5B. As with the selection in the HOME interface 402 of the ARTISTS item 406, a particular artist (or all artists) is selected by manipulating any of the user input devices 504 (such as the selector wheel 508) in combination with an appropriate selection event which can include pressing the central button 506. In this way, the user is provided the capability of navigating the user input menu in any manner that the user deems to be most convenient and efficient. It should be noted that a stack indicator bar 520 indicates the relative position of the selected item in relation to the stack of items associated with the particular selected group. For example, if the. Accordingly, FIGS. 5C-5E show various exemplary user interfaces consistent with the described embodiment of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of assisting user interaction with a multimedia asset player by way of a pathwise bi-directional user interface, said method comprising:
   displaying a first order user interface having a first list of user selectable items each of at least a plurality of which points to at least another list of user selectable items;
   receiving a user selection of one of the user selectable items from the first list, said receiving the user selection of one of the user selectable items from the first list including at least (i) successively highlighting one or more of the user selectable items from the first list using a rotational user action with respect to a user input device of the multimedia asset player and (ii) accepting a selection of one of the highlighted user selectable items; and
   automatically transitioning to and displaying a second order user interface based upon the selected one of the user selectable items from the first list, the second order user interface having a second list of user selectable items pointed to by the selected one of the user selectable items from the first list,
   wherein each of at least a plurality of the user selectable items in the second list points back to the corresponding one of the user selectable items in the first list and points forward to at least one user selectable item in a third list of user selectable items displayed by a corresponding third order user interface.

2. A method as recited in claim 1, wherein not more than one of the user selectable items in each of the first list, the second list and the third list are the same.

3. A method as recited in claim 1, wherein the first order user interface is a home interface.

4. A method as recited in claim 1, wherein the first list of user selectable items includes at least a playlists item, an artists item, and a songs item.

5. A method as recited in claim 4, wherein when the selected one of the user selectable items from the first list is the playlists item, then the second list of user selectable items being displayed in the second order user interface includes a list of playlists.

6. A method as recited in claim 4, wherein when the selected one of the user selectable items from the first list is the artists item, then the second list of user selectable items being displayed in the second order user interface includes an all artists indication and a list of particular artists.

7. A method as recited in claim 4, wherein when the selected one of the user selectable items from the first list is the songs item, then the second list of user selectable items being displayed in the second order user interface includes a list of all songs.

8. A method as recited in claim 1, wherein said method further comprises:
   automatically transitioning to and displaying a fourth order user interface based upon the selected one of the user selectable items from the third list.

9. A method as recited in claim 8, wherein the fourth order user interface is a play media asset interface.

10. A method as recited in claim 9, wherein when the play media asset interface is displayed, a previously selected media asset is played on the multimedia asset player.

11. A method as recited in claim 10, wherein the fourth order user interface presents media asset information pertaining to the previously selected media asset being played.

12. A method as recited in claim 10, wherein when the previously selected media asset is a digital audio file, then the associated media asset information includes title, artist, album, and duration.

13. A method as recited in claim 1, wherein the accepting of the selection of one of user selectable items comprises receiving a button press.

14. A pathwise bi-directional method of selecting a desired multimedia asset from a number of multimedia assets stored in a multimedia asset player comprising:
   (a) displaying a first order user interface having a first set of user selectable items each of which points to a second set of user selectable items displayed on a second order user interface;
   (b) receiving a user navigation input with respect to the first set of user selectable items to identify one of the user selectable items of the first set, the user navigation input being associated with a rotational user action with respect to a user input device of the multimedia asset player;
   (c) accepting the identified one of the user selectable items of the first set;
   (d) automatically transitioning to and displaying the second set of user selectable items each of which points back to the identified one of the user selectable items of the first set and points forward to a third order user interface; and
   (e) receiving and acting upon at least one additional user input until a desired multimedia asset is selected.

15. A method as recited in claim 14, wherein said receiving and acting (e) comprises:
   (e1) receiving a user navigation input with respect to the second set of user selectable items to identify one of the user selectable items of the second set, the user navigation input being associated with a rotational user action with respect to the user input device of the multimedia asset player;

(e2) accepting the identified one of the user selectable items of the second set; and (e3) automatically transitioning to and displaying the third order user interface based on the identified one of the user selectable items of the second set that has been accepted.

16. A method as recited in claim 15, wherein the third order user interface comprises a third set of user selectable items each of which points back to the identified one of the user selectable items of the second set and points forward to a fourth order user interface.

17. A method as recited in claim 15, wherein said accepting (c) and said accepting (e2) are associated with a button of the multimedia asset player.

18. A method as recited in claim 17, wherein the button is provided in an opening provided at a center of the user input device.

19. A method as recited in claim 14, wherein the multimedia asset is a digitized multimedia file.

20. A method as recited in claim 14, wherein the first set of user selectable items includes at least a playlists item, an artists item, and a songs item.

21. A method as recited in claim 20, wherein when the accepted item is the playlists item, then the second set of user selectable items includes a list of playlists, and wherein when the accepted item is the artists item, then the second set of user selectable items includes an all artists indication and a list of particular artists, and wherein when the accepted item is the songs item, then the second set includes a list of all songs stored in the multimedia asset player.

22. A method as recited in claim 14, wherein the user selectable items of the second set of user selectable items are completely different than the user selectable items of the first set of user selectable items.

* * * * *